United States Patent
Kim

(10) Patent No.: US 9,800,930 B2
(45) Date of Patent: *Oct. 24, 2017

(54) IMAGE PROCESSING APPARATUS AND METHOD FOR SELECTIVE POWER SUPPLY

(71) Applicant: SAMSUNG ELECTRONICS CO., LTD., Suwon-si, Gyeonggi-do (KR)

(72) Inventor: Ji-won Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/099,095

(22) Filed: Apr. 14, 2016

(65) Prior Publication Data

US 2016/0227154 A1    Aug. 4, 2016

Related U.S. Application Data

(63) Continuation of application No. 14/323,818, filed on Jul. 3, 2014, now Pat. No. 9,426,526, which is a (Continued)

(30) Foreign Application Priority Data

Mar. 2, 2011 (KR) .................. 10-2011-0018385

(51) Int. Cl.
*G06F 1/00* (2006.01)
*H04N 21/443* (2011.01)
(Continued)

(52) U.S. Cl.
CPC ......... *H04N 21/4436* (2013.01); *G09G 5/006* (2013.01); *H04N 5/63* (2013.01);
(Continued)

(58) Field of Classification Search
CPC ...... H04N 21/4436; H04N 5/63; G09G 5/006; G09G 5/003; G09G 2370/12; G09G 2330/02; G09G 2370/22
(Continued)

(56) References Cited

U.S. PATENT DOCUMENTS 6,727,952 B1    4/2004 Hirata et al.
8,084,987 B2   12/2011 Hurtz
(Continued)

FOREIGN PATENT DOCUMENTS

CN    1262536 A    8/2000
CN    1896755 A    1/2007
(Continued)

OTHER PUBLICATIONS

Communication dated Aug. 20, 2015 issued by Korean Intellectual Property Office in counterpart Korean Application No. 10-2011-0018385.
(Continued)

*Primary Examiner* — Vincent Tran
(74) *Attorney, Agent, or Firm* — Sughrue Mion, PLLC

(57) ABSTRACT

An image processing apparatus includes a chipset unit which processes data; a connector which includes a plurality of terminals, and is configured to connect with a cable so that the chipset unit can transmit and receive a signal to and from an external device; a switching unit which supplies power to the external device through a first terminal of the connector, and selectively controls a switching operation regarding whether or not to supply power to the first terminal on the basis of a signal state of a second terminal of the connector when the cable is connected to the connector. A control method of the image processing apparatus is also disclosed.

18 Claims, 8 Drawing Sheets

Related U.S. Application Data continuation of application No. 14/286,389, filed on May 23, 2014, now abandoned, which is a continuation of application No. 13/226,908, filed on Sep. 7, 2011, now Pat. No. 8,930,730.

(51) Int. Cl.
  *G09G 5/00* (2006.01)
  *H04N 21/4363* (2011.01)
  *H04N 5/63* (2006.01)
  *H04N 21/436* (2011.01)

(52) U.S. Cl.
  CPC . *H04N 21/43615* (2013.01); *H04N 21/43635* (2013.01); *G09G 5/003* (2013.01); *G09G 2330/02* (2013.01); *G09G 2370/04* (2013.01); *G09G 2370/12* (2013.01); *G09G 2370/22* (2013.01)

(58) Field of Classification Search
  USPC ......................................................... 713/310
  See application file for complete search history.

(56) References Cited

U.S. PATENT DOCUMENTS

| | | | |
|---|---|---|---|
| 2003/0030412 A1 | 2/2003 | Matsuda et al. | |
| 2007/0004270 A1 | 1/2007 | Kim et al. | |
| 2008/0126594 A1 | 5/2008 | Monks et al. | |
| 2008/0313477 A1 | 12/2008 | Numano | |
| 2009/0156051 A1 | 6/2009 | Doyle et al. | |
| 2009/0200871 A1 | 8/2009 | Luck et al. | |
| 2010/0060233 A1 | 3/2010 | Kung et al. | |
| 2010/0070659 A1 | 3/2010 | Ma et al. | |
| 2010/0109795 A1 | 5/2010 | Jones et al. | |
| 2010/0135429 A1 | 6/2010 | Nakajima | |
| 2010/0283532 A1 | 11/2010 | Horan et al. | |
| 2011/0068736 A1 | 3/2011 | Chartier et al. | |
| 2011/0167287 A1 | 7/2011 | Walsh et al. | |
| 2011/0191814 A1 | 8/2011 | Kobayashi | |
| 2011/0267135 A1* | 11/2011 | Chen .................. G06F 1/266 327/518 |
| 2012/0005377 A1 | 1/2012 | Kim et al. | |
| 2012/0036284 A1 | 2/2012 | Tao et al. | |
| 2012/0066529 A1 | 3/2012 | Numano | |
| 2012/0080954 A1 | 4/2012 | Gachon et al. | |
| 2012/0139474 A1 | 6/2012 | Cho et al. | |
| 2012/0226921 A1 | 9/2012 | Kim | |
| 2014/0320743 A1 | 10/2014 | Kim | |

FOREIGN PATENT DOCUMENTS

| | | |
|---|---|---|
| CN | 101542992 A | 9/2009 |
| CN | 101755249 A | 6/2010 |
| CN | 101910974 A | 12/2010 |
| CN | 104811807 A | 7/2015 |
| EP | 2172831 A1 | 4/2010 |
| EP | 2405654 A1 | 1/2012 |
| EP | 2521953 A1 | 11/2012 |
| WO | 2008052607 A2 | 5/2008 |
| WO | 2010051281 A2 | 5/2010 |
| WO | 2010119308 A2 | 10/2010 |
| WO | 2011084195 A1 | 7/2011 |
| WO | 2012003328 A2 | 1/2012 |

OTHER PUBLICATIONS

Communication dated Jul. 27, 2015 issued by European Patent Office in counterpart European Application No. 11182695.4.
Communication dated May 13, 2015 issued by Korean Intellectual Property Office in counterpart Korean Application No. 10-2011-0018385.
Communication from the European Patent Office issued Apr. 27, 2012 in counterpart European Application No. 11182695.4.
Communication issued on Feb. 3, 2016 by the State Intellectual Property Office of PR China in related Application No. 201510236251.4.
Communication issued on Feb. 12, 2015 by the European Patent Office in related Application No. 11182695.4.
Silicon Image: "sil9224 Vastlane Mobile HD Link Transmitter", Internet Citation, May 14, 2008 (May 14, 2008), pp. 1-2, XP002579469, Retrieved from the Internet: URL:http://www.siliconimage.com/docs/Sil9224_pb_FINAL_5-14-08.pdf.
Communication dated May 9, 2016, from the State Intellectual Property Office of People's Republic of China in counterpart Application No. 201210052794.7.
MHL Promoter., "MHL™ (Mobile High-definition Link) Specification", Jun. 2010, Version 1.0., MHL, LLC, (229 Total Pages).
Communication issued Sep. 8, 2016, issued by the European Patent Office in counterpart European Patent Application No. 16172970.2.

* cited by examiner

IMAGE PROCESSING APPARATUS AND METHOD FOR SELECTIVE POWER SUPPLY

CROSS-REFERENCE TO RELATED APPLICATION

This is a continuation application of U.S. patent application Ser. No. 14/323,818, filed on Jul. 3, 2014, in the U.S. Patent and Trademark Office, which is a continuation application of U.S. patent application Ser. No. 14/286,389, filed on May 23, 2014, in the U.S. Patent and Trademark Office, now abandoned, which is a continuation application of U.S. patent application Ser. No. 13/226,908, filed on Sep. 7, 2011, in the U.S. Patent and Trademark Office, now U.S. Pat. No. 8,930,730, which claims priority from Korean Patent Application No. 10-2011-0018385, filed on Mar. 2, 2011, in the Korean Intellectual Property Office, the disclosures of which are incorporated herein by reference.

BACKGROUND

1. Field

Methods and apparatuses consistent with the exemplary embodiments relate to an image processing apparatus, to which an external device is communicatively connected, depending on preset standards, and a control method thereof. More particularly, the exemplary embodiments are directed to an image processing apparatus having a structure where charge power can be supplied to an external device through a cable connected to the corresponding external device, and a control method thereof.

2. Description of the Related Art

An image processing apparatus processes video contents received from a exterior device through various processes, and either displays the processed video contents on its own display panel or outputs the processed video to another image processing apparatus to be displayed as an image on the corresponding image processing apparatus. The image processing apparatus may include a television or a monitor in the situation of having its own display panel, or may include a digital versatile disc (DVD)/Blu-ray disc (BD), a set top box, etc. in the situation of having no display panel.

Generally, an image processing system having plural image processing apparatuses communicatively connected each other, by a wire or wirelessly, is often used, rather than using an image processing apparatus independently. For instance, there is a system where a DVD/BD player and a TV are connected by a cable complying with preset standards, and an image reproduced by the DVD/BD player is displayed on the TV.

Also, power or a control signal for operational control as well as a video signal containing video contents may be transmitted and received between an image processing apparatus and another image processing apparatus, which are connected to each other. To this end, a cable and a connector of the image processing apparatus, to which the cable is connected, have a plurality of corresponding pins or terminals, in order that the cable and the connector can be physically connected to each other, thereby transmitting various characteristic signals through the plurality of pins or terminals.

SUMMARY

Accordingly, the foregoing and/or other aspects may be achieved by providing an image processing apparatus including: a chipset unit which processes data; a connector which includes a plurality of terminals, and connects with a cable so that the chipset unit can transmit and receive a signal to and from an external device; and a switching unit which supplies power from the image processing apparatus to the external device through a first terminal of the connector, and selectively controls a switching operation regarding whether to supply power of the image processing apparatus to the first terminal on the basis of a signal state of a second terminal of the connector when the cable is connected to the connector.

The signal state of the second terminal may be varied depending on whether a third terminal of the connector is connected to the second terminal. The switching unit may allow power from the image processing apparatus to be supplied to the first terminal, such as a cable complying with a first preset standard to connect the second terminal and the third terminal.

The switching unit may include a detection circuit which detects whether the second terminal and the third terminal are connected; and a first switching circuit which is turned on to supply power from the image processing apparatus to the first terminal in response to a detection by the detection circuit that the second terminal and the third terminal are connected.

The detection circuit may include a pull-up circuit connected to the third terminal. The first switching circuit may be connected to the second terminal and turned on by the pull-up circuit so that power from the image processing apparatus can be transmitted to the first terminal when the second terminal and the third terminal are connected.

The pull-up circuit may include a resistor connected to power and the third terminal.

The detection circuit may include a pull-down circuit connected to the second terminal and the first switching circuit. The first switching circuit may be turned off by the pull-down circuit so that the power of the image processing apparatus cannot be transmitted to the first terminal when the second terminal and the third terminal are disconnected.

The pull-down circuit may include a resistor connected to ground.

The switching unit may include a second switching circuit for connecting the chipset unit to the first terminal and the first switching circuit.

The second switching circuit may be turned on or off by the pull-up circuit and the pull-down circuit in a reverse manner as with the first switching circuit.

The second switching circuit may prevent the power of the image processing apparatus supplied to the first terminal from being supplied to the chipset unit when the first switching circuit is turned on. The second switching circuit may allow the first terminal and the chipset unit to be connected when the first switching circuit is turned off.

The switching unit may include a controller which turns on the first switching circuit and turns off the second switching circuit in response to connection to the pull-up circuit. The controller may turn off the first switching circuit and turn on the second switching circuit in response to being disconnected from the pull-up circuit.

The switching unit may shut off the power from the image processing apparatus to the first terminal in response to the cable connected to the connector complying with a second preset standard not to connect the second terminal and the third terminal, or in response to the cable not being connected to the connector.

The cable corresponding to the first standard may comply with mobile high-definition link (MHL) standards, and the cable corresponding to the second standard may comply with high-definition multimedia interface (HDMI) standards.

Another aspect may be achieved by providing a control method of an image processing apparatus including a chipset unit which processes data; and a connector which includes a plurality of terminals and connects with a cable so that the chipset unit can transmit and receive a signal to and from an external device, the method including: selectively switching whether to supply power from the image processing apparatus to a first terminal on the basis of a signal state of a second terminal of the connector different from the first terminal of the connector, providing power from the image processing apparatus to the external device, when the cable is connected to the connector; and transmitting the power of the image processing apparatus to the first terminal in response to the second terminal being in a preset signal state.

The signal state of the second terminal may be varied depending on whether a third terminal of the connector is connected to the second terminal. The switching may include allowing the power from the image processing apparatus to be supplied to the first terminal as the cable, complying with a first preset standard connects the second terminal and the third terminal.

The switching may include detecting whether the second terminal and the third terminal are connected; allowing the power from the image processing apparatus to be supplied to the first terminal in response to a detection that the second terminal and the third terminal are connected; and shutting off the power from the image processing apparatus to the first terminal in response to a detection that the second terminal and the third terminal are disconnected.

The allowing the power of the image processing apparatus to be supplied to the first terminal in response to a detection that the second terminal and the third terminal are connected may include preventing the power from the image processing apparatus, supplied to the first terminal, from being supplied to the chipset unit.

The shutting off of the power from the image processing apparatus to the first terminal in response to a detection that the second terminal and the third terminal are disconnected, may include allowing the first terminal and the chipset unit to be connected.

The switching may include shutting off the power from the image processing apparatus to the first terminal in response to the cable connected to the connector complying with a second preset standard not to connect the second terminal and the third terminal, or in response to the cable not being connected to the connector.

The cable corresponding to the first standard may comply with mobile high-definition link (MHL) standards, and the cable corresponding to the second standard may comply with high-definition multimedia interface (HDMI) standards.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. Exemplary embodiments will be described regarding elements that directly relate to the spirit of the present inventive concept, and descriptions of other elements will be omitted. However, this does not mean that the elements whose descriptions are omitted are unnecessary for embodying an apparatus or system to which the spirit of the present inventive concept is applied.

Figure 1:
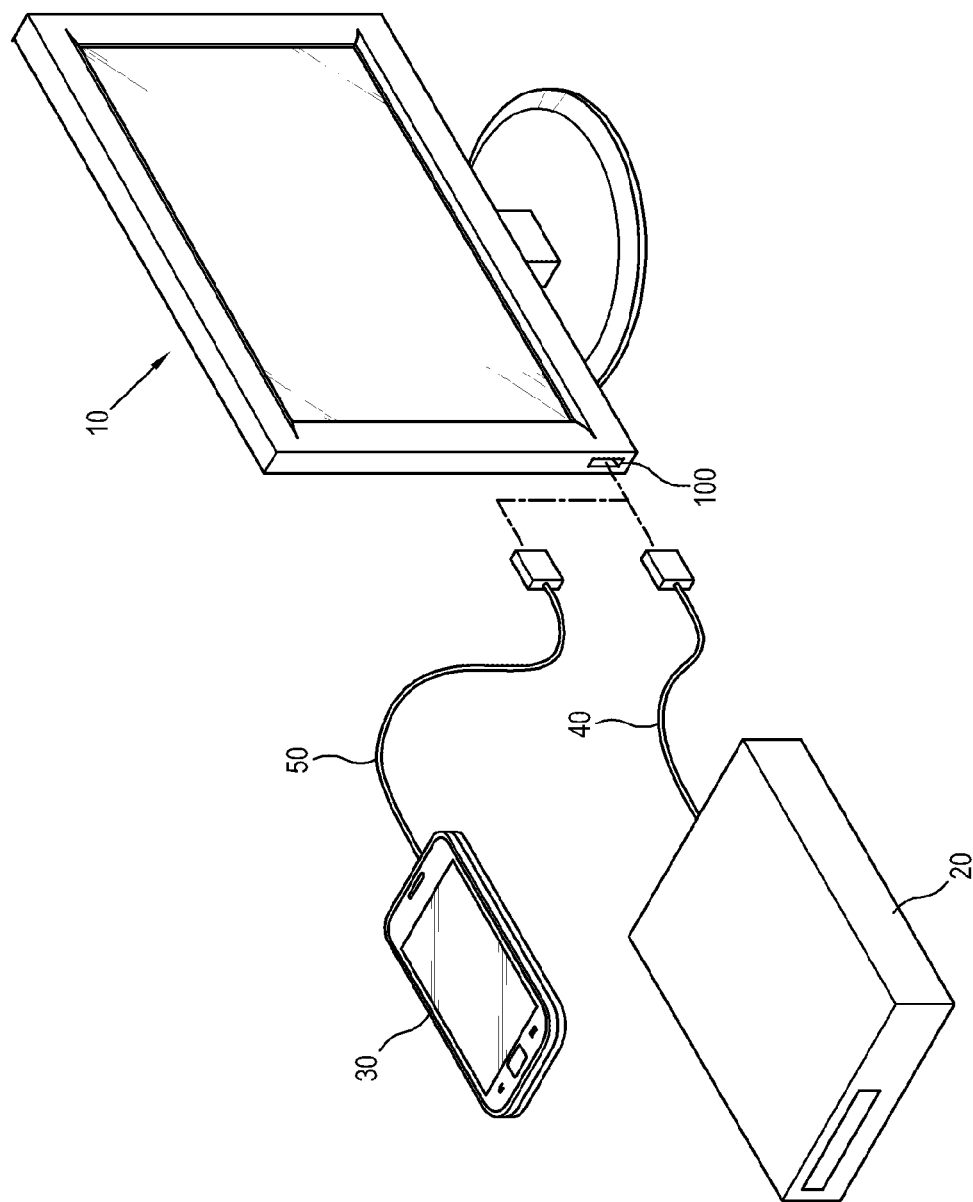
FIG. 1 illustrates an image processing apparatus and an external device according to a first exemplary embodiment.

FIG. 1 illustrates an external device 30 connected to an image processing apparatus 10 according to a first exemplary embodiment.

As shown therein, the image processing apparatus 10 and external devices 20 and 30 are connected for interactive communication through cables 40 and 50. To this end, image processing apparatus 10 includes at least one connector 100 to which cables 40 and 50 are physically connected.

In this exemplary embodiment, image processing apparatus 10 includes one connector 100, but not limited thereto. The image processing apparatus may include a plurality of connectors 100, and each connector 100 may correspond to one connector 100 described in this exemplary embodiment.

Also, in this exemplary embodiment, image processing apparatus 10 is a display apparatus capable of displaying an image, and external devices 20 and 30 are a DVD/BD player 20 or a mobile device 30, but not limited thereto. However, in light of embodying the image processing apparatus 10 to which the spirit of the present invention is applied, the above examples do not limit the spirit of the inventive concept.

Image processing apparatus 10 can be connected to one of external devices 20 and 30 through connector 100 and cables 40 and 50 connected to connector 100. Image processing apparatus 10 can interactively communicate with external devices 20 and 30. Further, various characteristic signals, such as, a video signal containing video contents, a control signal for operation control of the image processing apparatus 10 or external devices 20 and 30, or unlimited various kinds of data, power, etc. may be transmitted and received between image processing apparatus 10 and external devices 20 and 30.

In this exemplary embodiment, connector 100 of image processing apparatus 10 complies with high definition multimedia interface (HDMI) standards. Connector 100, in accordance with HDMI standards, includes 19 pins/terminals for transmitting a signal.

Between cables 40 and 50, which are respectively connected to external devices 20 and 30, a first cable 40 connected to first device 20 complies with the HDMI standards, like connector 100. However, a second cable 50 connected to second device 30 complies with mobile high-definition link (MHL) standards.

The MHL standard is a modified protocol of the HDMI standard for connecting a relatively small mobile device 30 with image processing apparatus 10. Second cable 50 of the MHL standards is connectable with connector 100 of the HDMI standards. Second cable 50 uses 6 terminals from among the 19 terminals of connector 100. Cable 50 of the MHL standards is different from cable 40 of the HDML standards in characteristics or transmissive direction of a signal transmitted through these 6 terminals. In the situation where cables 40 and 50 are connected to connector 100, an example where a signal is assigned to each terminal of connector 100 in accordance with respective standards, will be described later.

In this exemplary embodiment, the HDMI and MHL standards and the number of terminals provided in connector 100 are specifically described, but not limited thereto. That is, the spirit of the present inventive concept may be applied to the HDMI and MHL standards with the exception that the standards specifically illustrated in this exemplary embodiment, and may not be restricted by the number and configurations of terminals provided in the connector 100, signal assignment of each terminal, etc.

Figure 2:
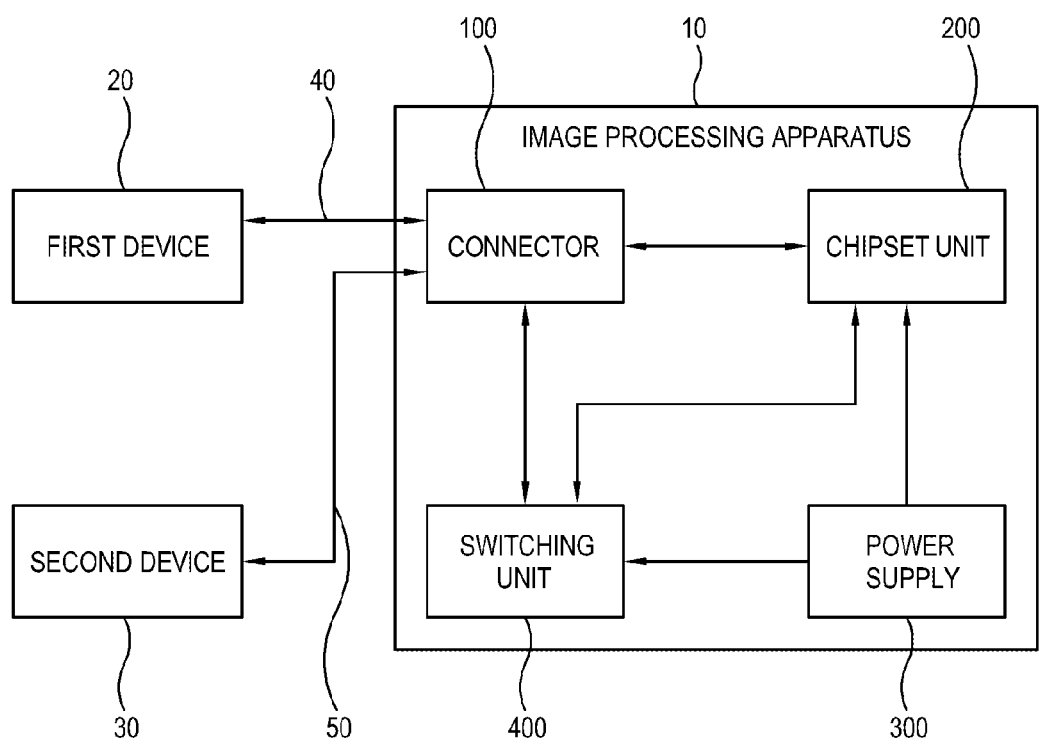
FIG. 2 is a block diagram of the image processing apparatus of FIG. 1.

Below, detailed configurations of image processing apparatus 10 will be described with reference to FIG. 2. FIG. 2 is a block diagram of the image processing apparatus of FIG. 1.

As shown in FIG. 2, image processing apparatus 10 includes a connector 100 to which a first cable 40 connecting with a first device 20 or a second cable 50 connecting with a second device 30 is connected. Image processing apparatus 10 further includes chipset unit 200 which processes data on the basis of a preset process, and a power supply 300 which supplies operation power to different elements.

In this exemplary embodiment, connector 100 complies with the HDMI standards, and allows one of the external devices 20 and 30 to interactively communicate with chipset unit 200. Detailed configurations of connector 100 will be described later.

Chipset unit 200 is achieved by a system-on-chip (SOC) or a combination group of various chipsets, and performs various processes related to image processing. Chipset unit 200 may transmit and receive data/control signal/power/etc. to and from external device 20, 30 connected through connector 100, as well as perform the image processing, and processes the corresponding data/control signal/power on the basis of the preset process.

Power supply 300 converts alternating current (AC) power received from the exterior of image processing apparatus 10 into direct current (DC) power of various levels, and supplies them to the respective elements of image processing apparatus 10. Alternatively, power supply 300 may receive DC power from a battery (not shown) and supply power to image processing apparatus 10.

Figure 3:
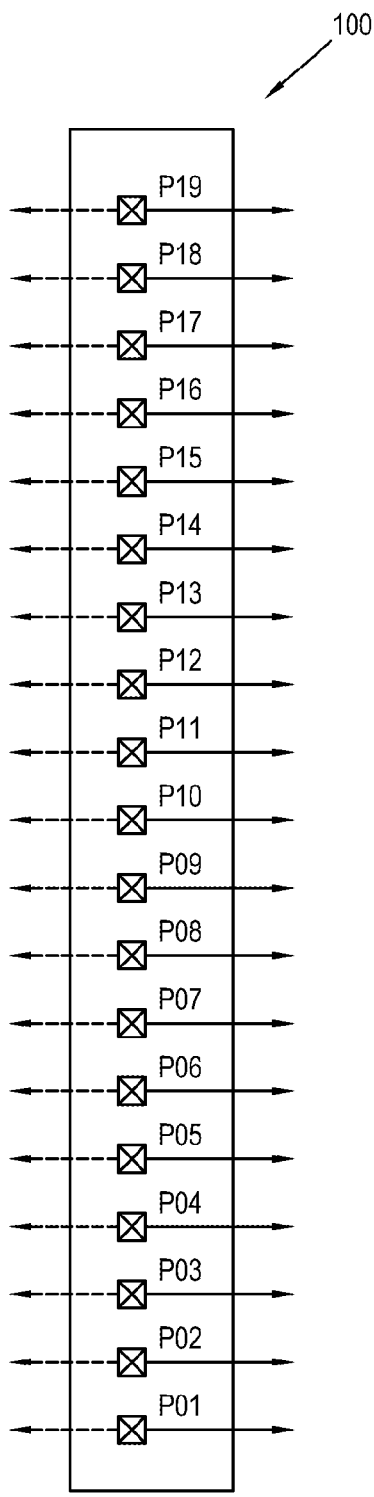
FIG. 3 illustrates a configuration of a connector in the image processing apparatus of FIG. 1.

Here, connector 100 has 19 terminals based on the HDMI standards, as shown in FIG. 3. FIG. 3 shows the respective terminals of the connector 100.

Referring to FIG. 3, connector 100 includes total 19 terminals from P01 to P19. If first cable 40, complying with the HDMI standards, is connected to connector 100, 19 terminals of connector 100 are connected, respectively, to 19 terminals of first cable 40.

In the HDMI standards, the characteristics of signals assigned to the respective terminals will be shown in the following table 1. The signal assignment as shown in the table 1 is simply an example, and does not limit the inventive concept.

TABLE 1

| Terminal | Assigned signal |
|---|---|
| P01 | TMDS data 2+ |
| P02 | TMDS data 2 shield |
| P03 | TMDS data 2− |
| P04 | TMDS data 1+ |
| P05 | TMDS data 1 shield |
| P06 | TMDS data 1− |
| P07 | TMDS data 0+ |
| P08 | TMDS data 0 shield |
| P09 | TMDS data 0 |
| P10 | TMDS clock + |
| P11 | TMDS clock shield |
| P12 | TMDS clock − |
| P13 | CEC |
| P14 | Reserve |
| P15 | DDC clock |
| P16 | DDC data |
| P17 | Ground |
| P18 | +5 V power at transmission side |
| P19 | Hot plug detection |

In table 1, TMDS is the acronym of transition minimized differential signaling. CED is the acronym of consumer electronics control, and DDC is the acronym of display data channel.

Meanwhile, if second cable 50, complying with the MHL standards, is connected to connector 100, 6 terminals (P02, P10, P12, P15, P18 and P19) of the among 19 terminals (P01 to P19) of connector 100 are connected to second cable 50. In this situation, the characteristics of the signals assigned to the respective terminals (P01 to P19) of connector 100, as shown in the table 1 are changed. For example, when second cable 50 is connected, a signal where data and clocks are combined is transmitted and received through terminals P10 and P12; terminal P18 forms a power bus, and terminal P19 forms a control bus.

With this configuration, in response to second cable 50 being connected to connector 100, chipset unit 200 of image processing apparatus 10 is configured to supply charging power to second device 30 when receiving a preset control signal from second device 30.

In this situation, the second device 30 has to transmit the control signal to image processing apparatus 10. Therefore, power remaining in the battery (not shown) of second device 30 has to be sufficient enough to transmit the control signal. That is, with the above configuration, in response to the power remaining in the battery (not shown) of second device 30 being zero, it is difficult for image processing apparatus 10 to supply the charging power to second device 30.

In addition, chipset unit 200 controls the power to be supplied from power supply 300 to second device 30. Thus, chipset unit 200 enters a standby mode in a standby mode of image processing apparatus 10. Accordingly, it is difficult to supply power to the second device. That is, in response to image processing apparatus 10 not being a normal mode but rather being in the standby mode, it is difficult to supply charging power to second device 30.

Taking this point into account, image processing apparatus 10 in this exemplary embodiment includes a switching unit 400, as shown in FIG. 2.

If there are a first terminal, a second terminal and a third terminal from among the plural terminals of connector 100, switching unit 400 can supply the power of image processing apparatus 10 to external device 30 via the first terminal, and selectively switches the supply of power to the first terminal on the basis of a signal state of the second terminal, when cable 40, 50 is connected to connector 100.

Here, the signal state of the second terminal is, for example, changed between high and low (or between 0 and 1) in accordance with whether or not the third terminal of connector 100 is connected to the second terminal. Based on such a signal state, switching unit 400 can detect whether second cable 50 complying with the MHL standards, is connected to connector 100. In response to a detection that second cable 50, complying with the MHL standards, is connected, switching unit 400 allows the power of image processing apparatus 10 to be supplied to the first terminal.

Thus, image processing apparatus 10 can supply the charge power to second device 30 via second cable 50 even though the power remaining in the battery (not shown) of second device 30 is zero or image processing apparatus 10 is in the standby mode.

Figure 4:
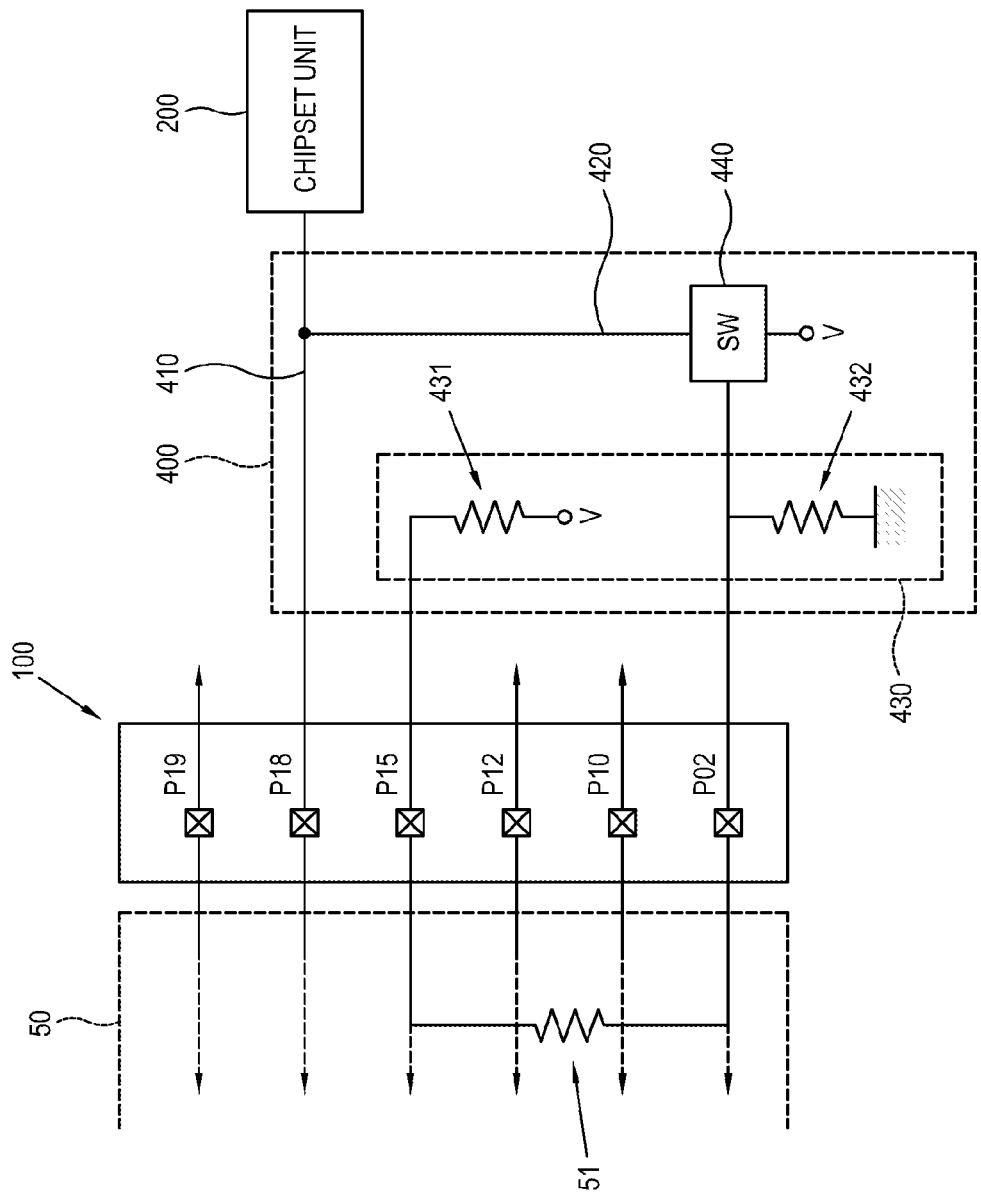
FIG. 4 is a circuit diagram of the connector and a switching unit in the image processing apparatus of FIG. 1.

Below, detailed configurations of connector 100 and the switching unit 400, in this exemplary embodiment, will be described with reference to FIG. 4. FIG. 4 is a circuit diagram of the connector and a switching unit in the image processing apparatus of FIG. 1. In the following exemplary embodiments and drawings, only minimum configurations directly related to the present inventive concept will be described and illustrated.

As shown in FIG. 4, terminals P02, P10, P12, P15, P18 and P19, from among the 19 terminals of connector 100, comply with the MHL standards. Among them, terminal P18 is connected to chipset unit 200 via a first line 410, and a second line 420 is connected to the power of the image processing apparatus 10, e.g., standby power of +5V is branched from first line 410.

Switching unit 400 includes a detection circuit 430 for detecting a connection between the terminals P02 and P15, and a switching circuit 440, which is turned on in order to supply the power of image processing apparatus 10 to terminal P18 in response to a detection by detection circuit 430 that terminals P02 and P15 are connected.

Detection circuit 430 includes a pull-up circuit 431 connected to the terminal P15, and a pull-down circuit 432 connected to terminal P02. Pull-up circuit 431 and pull-down circuit 432 are configured, respectively, to include resistors having predetermined resistance. Pull-up circuit 431 connects to the power of +5V, as the standby power for image processing apparatus 10, and pull-down circuit 432 connects to ground.

Switching circuit 440 is installed on second line 420, and connects with terminal P02 and pull-down circuit 432. Switching circuit 440 is configured to include a transistor (not shown) to which the power of image processing apparatus 10 is connected. In response to connector 100 not being connected with any cable 40, 50 or connects with first cable 40 complying with the HDMI standards, switching circuit 440 is turned off by pull-down circuit 432. Thus, second line 420 becomes open and the power passing through second line 420 is shut off.

Meanwhile, second cable 50, complying with the MHL standards is configured to include lines, respectively which correspond to terminals P02 and P15 of connector 100, which are connected to each other through a resistor 51 having predetermined resistance, e.g., 3.3 kΩ.

Accordingly, in response to second cable 50 being connected to connector 100, terminals P02 and P15 are connected to each other and the pull-up circuit 431 is connected to switching circuit 440. The connection is via the terminal P15, the second cable 50 and the terminal P02. At this time, pull-up circuit 431 causes the signal state of terminal P02 to become high, by way of example, between high and low. For reference, the high/low states are provided just to distinguish the signal states from one another.

Accordingly, switching circuit 440 is turned on by pull-up circuit 431, and therefore second line 420 becomes closed and the power is supplied to first line 410 and terminal P18. This supplied power for charging is supplied from terminal P18 to second device 30 via the second cable 50.

In this manner, switching unit 400 can selectively supply power to terminal P18 in accordance with second cable 50 complying with the MHL standards. Thus, even though the power remaining in the battery (not shown) of second device 30 is zero or image processing apparatus 10 is in the standby mode, image processing apparatus 10 can supply power to second device 30.

In the meantime, in response to second cable 50 being separated from connector 100 or first cable 40, complying with the HDMI standards, is connected to connector 100, terminals P02 and P15 are disconnected. Pull-up circuit 431 and switching circuit 440 are disconnected, and at this time the signal state of terminal P02 becomes low by pull-down circuit 432.

Accordingly, switching circuit 440 is turned off by pull-down circuit 432, and shuts off the power supplied through second line 420. Thus, second line 420 is switched to become open/closed in accordance with the standards of whichever cable 40, 50 is connected to connector 100.

Meanwhile, as described in the foregoing first exemplary embodiment, the apparatus may be configured to prevent the power supplied to terminal P18 from being supplied to chipset unit 200 when second cable 50 is connected to connector 100.

Figure 5:
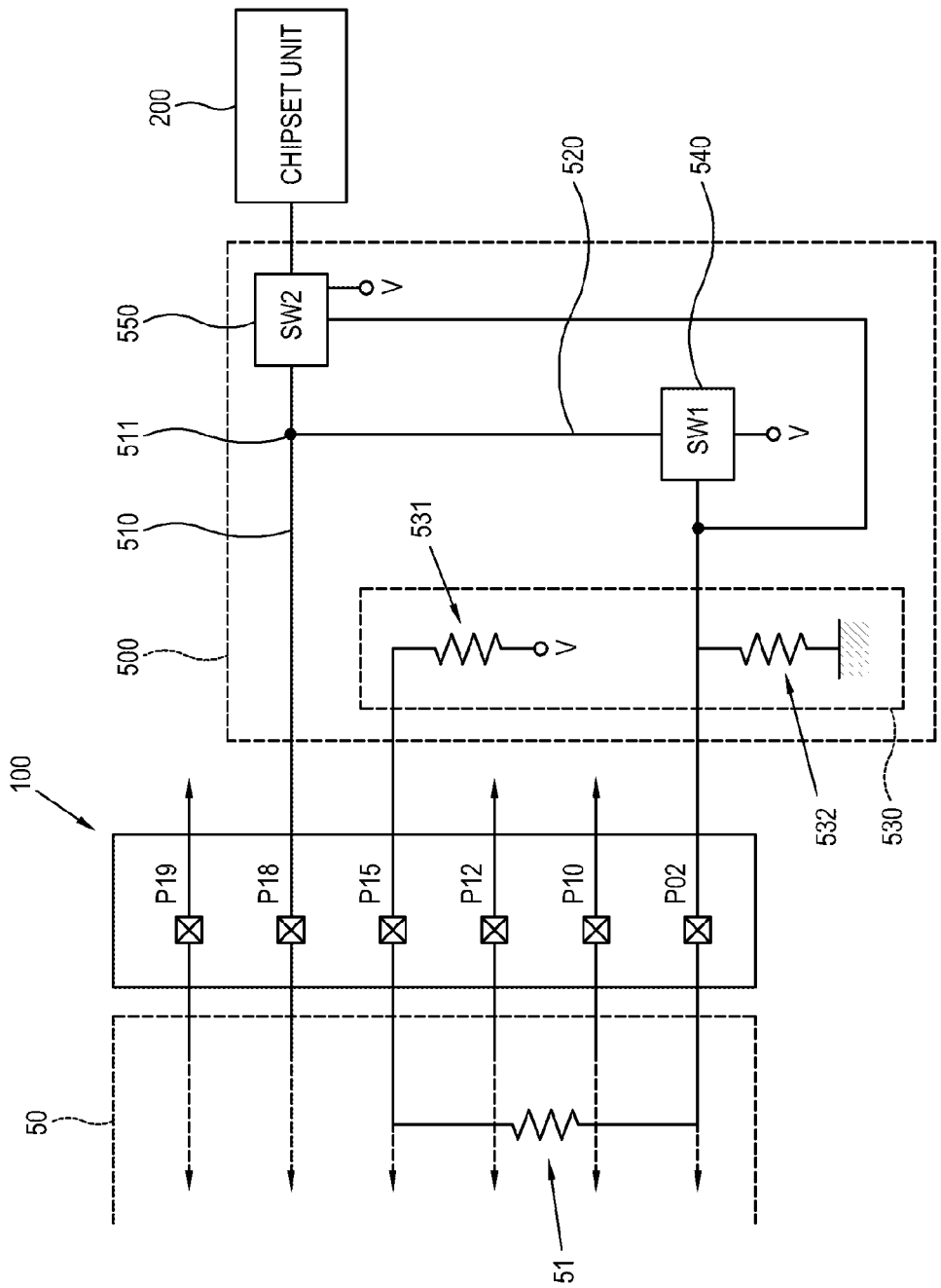
FIG. 5 is a circuit diagram of a connector and a switching unit in an image processing apparatus according to a second exemplary embodiment.

Below, such a configuration will be described as the second exemplary embodiment, with reference to FIG. 5. FIG. 5 is a schematic circuit diagram of connector 100 and switching unit 500 in an image processing apparatus according to a second exemplary embodiment.

As shown in FIG. 5, a first line 510 connects the chipset unit 200 and the terminal P18. A second line 520, to which power is supplied, is branched from a node 511 of first line 510.

Switching unit 500 includes a detection circuit 530 for detecting a connection between terminals P02 and P15, a first switching circuit 540 installed on second line 520 and switching second line 520 to be opened and closed. A second switching circuit 550 is installed on first line 510 between node 511 and chipset unit 200 of first line 510 and switches first line 510 open and closed.

Detection circuit 530 includes a pull-up circuit 531 connected to terminal P15, and a pull-down circuit 532 connected to terminal P02. Detection circuit 530 and first switching circuit 540 correspond to detection circuit 430 and switching circuit 440 (refer to FIG. 4) described in the foregoing first exemplary embodiment. Thus, repetitive descriptions thereof will be avoided.

Second switching circuit 550 switches connection of the chipset unit 200 to terminal P18 and switching circuit 540. Second switching circuit 550 is achieved by a transistor such as the transistor in first switching circuit 540, and is switched to be turned on/off by detection circuit 530. Second switching circuit 550 is turned on/off in reverse to first switching circuit 540, under operation of detection circuit 530, i.e., the pull-up circuit 531 and pull-down circuit 532.

Specifically, when terminals P02 and P15 are connected via second cable 50, pull-up circuit 531 turns on first switching circuit 540 and turns off second switching circuit 550. That is, since first switching circuit 540 is turned off, the power supplied through second line 520 is shut off. However, the connection between terminal P18 and chipset unit 200 is permitted. In response to first cable 40 being connected to connector 100, chipset unit 200 may receive power from first device 20, via the terminal P18.

Thus, according to this exemplary embodiment, the power supply through terminal P18 and the connection of chipset unit 200 to terminal P18 can be switched in accordance with whether or not cable 50, complying with the MHL standards, is connected to connector 100.

Figure 6:
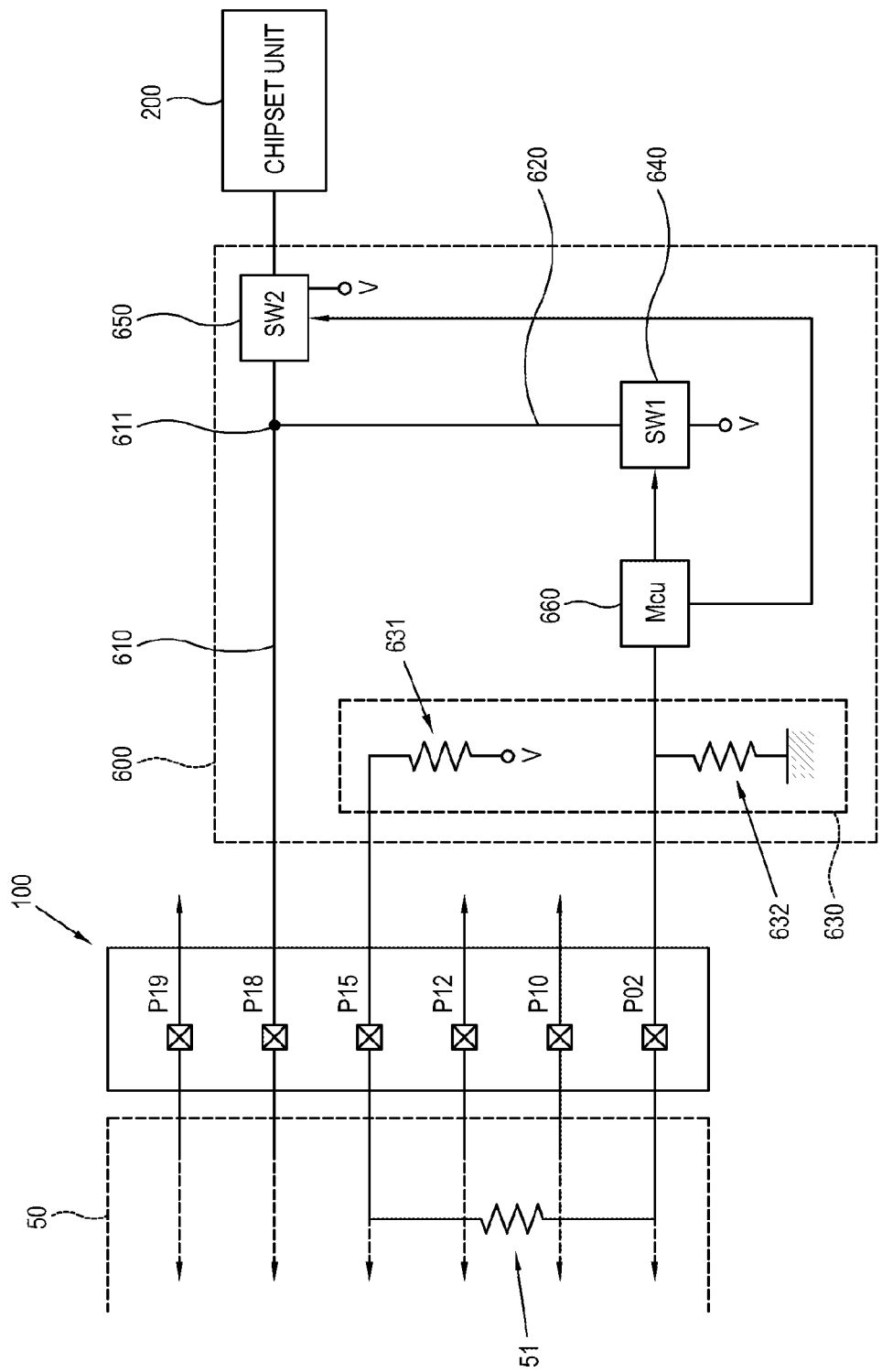
FIG. 6 is a circuit diagram of a connector and a switching unit in an image processing apparatus according to a third exemplary embodiment.

Meanwhile, a controller 660 may be installed separately in order to control the switching operations of first switching circuit 540 and second switching circuit 550, which will be described below as a third exemplary embodiment with reference to FIG. 6. FIG. 6 is a circuit diagram of a connector 100 and a switching unit 600 in an image processing apparatus according to the third exemplary embodiment.

As shown in FIG. 6, a first line 610 connects chipset unit 200 and terminal P18, and a second line 620, to which power is supplied, is branched from a node 611 of first line 610.

Switching unit 600 includes a detection circuit 630, a first switching circuit 640 and a second switching circuit 650.

Detection circuit 630 includes a pull-up circuit 631 connected to the terminal P15, and a pull-down circuit 632 connected to terminal P02, which correspond to those of the second exemplary embodiment. Thus, repetitive descriptions thereof will be avoided. First switching circuit 640 switches second line 620 to be opened and closed, and second switching circuit 650 switches first line 610 between node 611 and chipset unit 200 to be opened and closed.

Further, switching unit 600 in this exemplary embodiment includes controller 660 for selectively controlling switching operations of first switching circuit 640 and second switching circuit 650 in accordance with detection results of detection circuit 630. Controller 660 is connected to terminal P02 and pull-down circuit 632.

In this exemplary embodiment, controller 660 may be achieved by a micro controller unit (MCU), and first switching circuit 640 and second switching circuit 650 may be achieved by a transistor, a relay, etc., but are not limited thereto.

With this configuration, if in response to second cable 50 being connected to connector 100, pull-up circuit 631 for example applies a high signal to controller 660. Thus, controller 660 turns on first switching circuit 640 and turns off second switching circuit 650.

On the other hand, in response to second cable 50 disconnected from connector 100 or first cable 40 is connected to connector 100, connection with pull-up circuit 631 is released and pull-down circuit 632 applies a low signal to controller 660. Thus, controller 660 turns off first switching circuit 640 and turns on second switching circuit 650.

With regard to whether to supply power, connection states between the elements, etc., depending on the turned-on/off states of first switching circuit 640 and second switching circuit 650, the foregoing exemplary embodiments may be applied thereto and thus repetitive descriptions thereof will be avoided.

Figure 7:
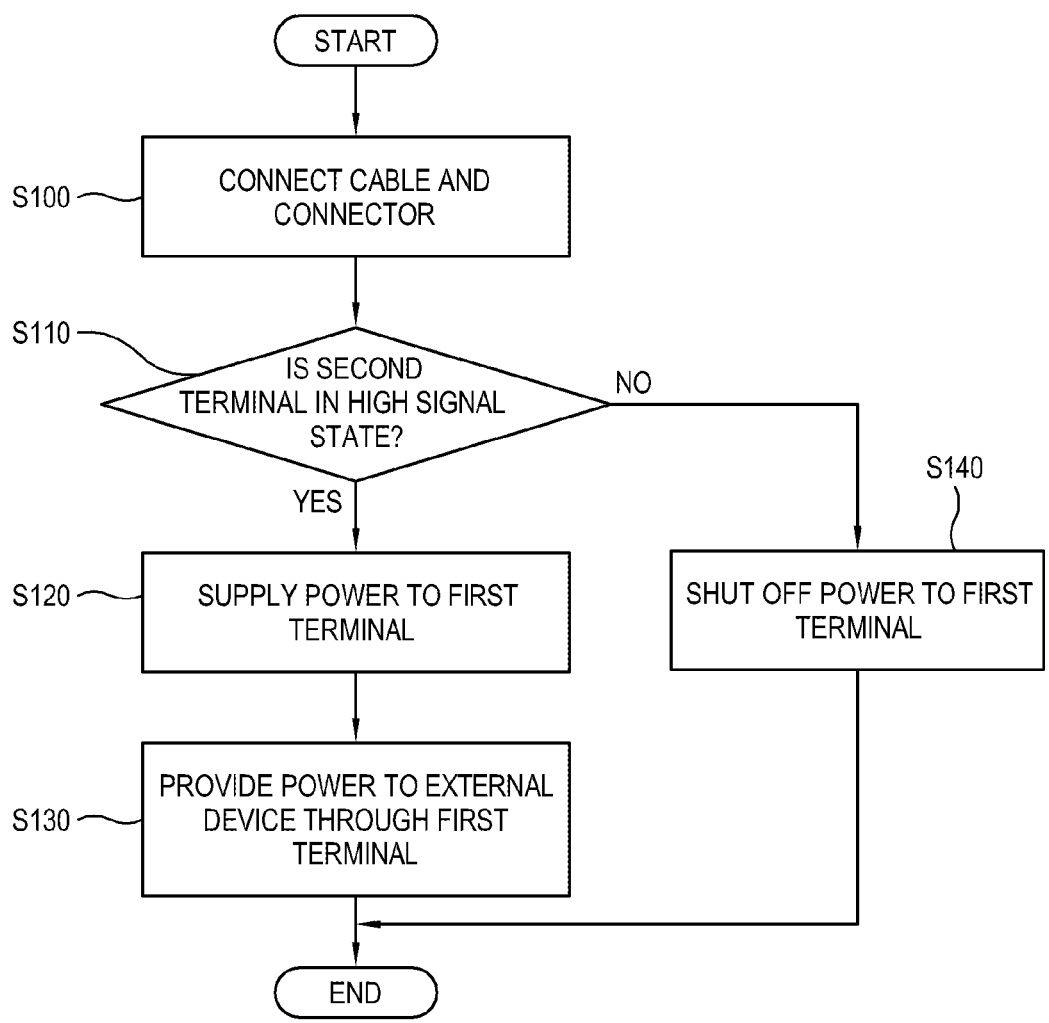
FIG. 7 is a flowchart showing operation of an image processing apparatus according to a fourth exemplary embodiment.

Below, an operation of image processing apparatus 10 according to a fourth exemplary embodiment will be described with reference to FIG. 7. FIG. 7 is a flowchart showing this operation.

Connector 100, in this exemplary embodiment includes a first terminal capable of supplying power to external device 30, and second and third terminals for detecting a change in a signal state, depending on connection of the cable 40, 50.

As shown in FIG. 7, in response to cable 40, 50 being physically connected to connector 100 (S100), image forming apparatus 10 determines whether the second terminal is in a high signal state (S110).

If the second terminal is in the high signal state, image processing apparatus 10 allows its own power to be supplied to first terminal (S120), and thus provides the power to external device 30 through first terminal (S130).

On the other hand, in response to the second terminal not being in the high signal state, image processing apparatus 10 shuts off its own power to first terminal (S140).

Figure 8:
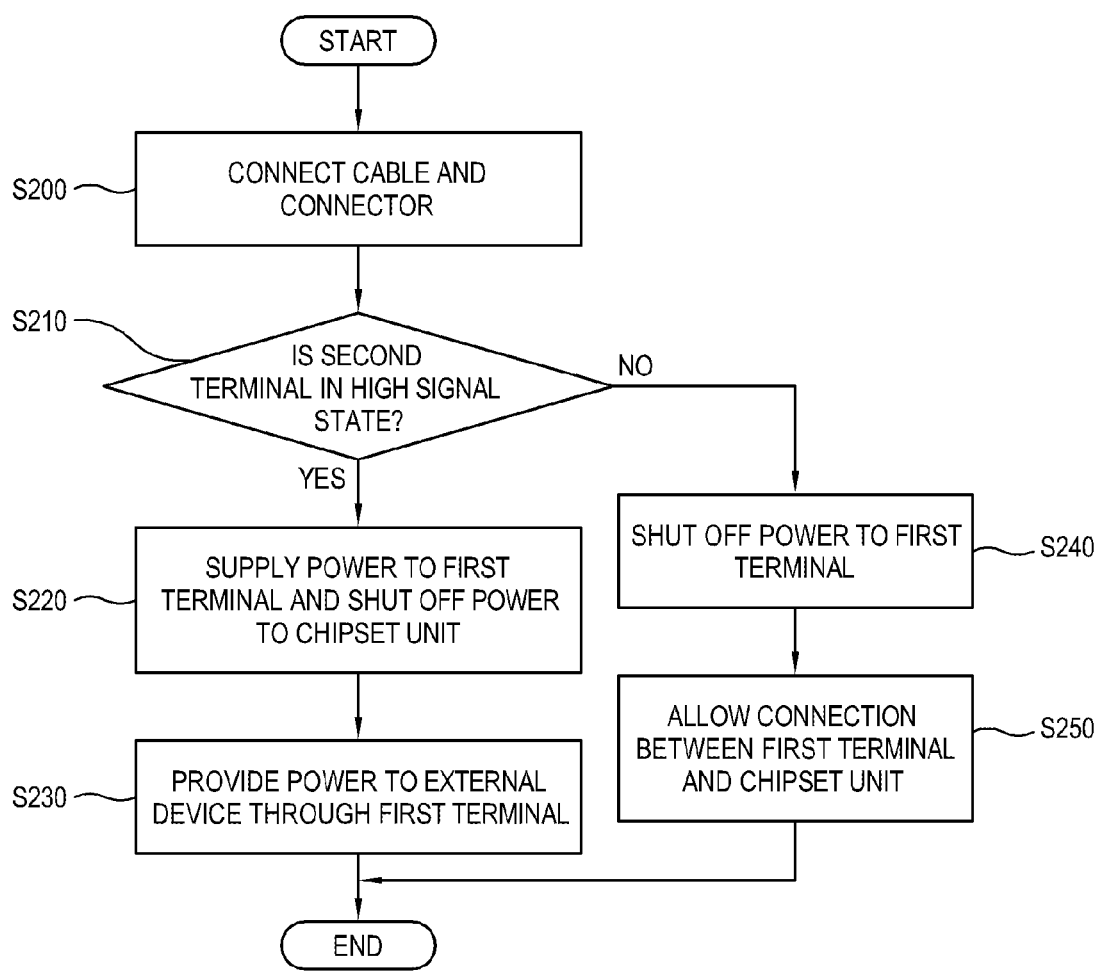
FIG. 8 is a flowchart showing operation of an image processing apparatus according to a fifth exemplary embodiment.

Below, an operation of the image processing apparatus 10 according to a fifth exemplary embodiment will be described with reference to FIG. 8. FIG. 8 is a flowchart showing this operation.

Connector 100 in this exemplary embodiment includes a first terminal capable of supplying power to external device 30, and second and third terminals for detecting change in a signal state depending on connection of cable 40, 50.

As shown in FIG. 8, in response to cable 40, 50 being physically connected to the connector 100 (S200), image forming apparatus 10 determines whether or not the second terminal is in a high signal state (S210).

If the second terminal is in the high signal state, image processing apparatus 10 allows its own power to be supplied to first terminal and shuts off the power to chipset unit 200 (S220). Further, image processing apparatus 10 provides power to external device 30 through first terminal (S230).

On the other hand, if the second terminal is not in the high signal state, image processing apparatus 10 shuts off its own power to the first terminal (S240) and allows a connection between the first terminal and chipset unit 200 (S250).

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
a signal processor;
a connector configured to connect to a cable to transmit signals between the signal processor and an external device, the connector compliant with high-definition multimedia interface (HDMI) standards comprising a plurality of terminals including a first terminal, a second terminal being a transition minimized differential signaling (TMDS) data 2 shield terminal of the connector, and a third terminal being a display data channel (DDC) Clock terminal of the connector;
a switching unit connected to the first terminal; and
a power supply configured to supply power to the signal processor and the switching unit,
wherein the switching unit is configured to detect whether the second terminal and the third terminal are connected with each other while the signal processor is in a stand-by mode,
wherein the switching unit is configured to switch on to allow the power from the power supply to be transmitted to the external device via the first terminal in response to the second terminal and the third terminal being connected with each other due to the cable compliant with mobile high-definition link (MHL) standards being connected to the connector.

2. The image processing apparatus according to claim 1, wherein the switching unit is further configured to switch off to cut off the power from the power supply to the first terminal when the second terminal and the third terminal are not connected with each other while the signal processor is in the stand-by mode.

3. The image processing apparatus according to claim 1, wherein the switching unit is configured to switch on or off based on a signal state of the second terminal.

4. The image processing apparatus according to claim 3, wherein the signal state of the second terminal is configured to be varied depending on whether or not the third terminal is connected to the second terminal, and
wherein the switching unit is further configured to allow the power to be supplied to the first terminal, as the cable complying with a first standard preset to connect the second terminal and the third terminal is connected.

5. The image processing apparatus according to claim 4, wherein the switching unit comprises:
a detection circuit configured to detect a connection between the second terminal and the third terminal; and
a first switching circuit configured to be turned on so as to supply power from the power supply to the first terminal in response to the detection circuit detecting that the second terminal and the third terminal are connected with each other.

6. The image processing apparatus according to claim 5, wherein:
the detection circuit comprises a pull-up circuit connected to the third terminal, and
the first switching circuit is connected to the second terminal and configured to be turned on by the pull-up circuit, so that power can be transmitted to the first terminal while the second terminal and the third terminal are connected with each other.

7. The image processing apparatus according to claim 6, wherein
the pull-up circuit comprises a resistor connected to the power supply and the third terminal.

8. The image processing apparatus according to claim 6, wherein:
the detection circuit further comprises a pull-down circuit connected to the second terminal and the first switching circuit, and
the first switching circuit is configured to be turned off by the pull-down circuit so that the power from the power supply cannot be transmitted to the first terminal when the second terminal and the third terminal are disconnected from each other.

9. The image processing apparatus according to claim 8, wherein the pull-down circuit comprises a resistor connected to ground.

10. The image processing apparatus according to claim 8, wherein the switching unit further comprises a second switching circuit configured to switch in order to connect or disconnect the signal processor to the first terminal and the first switching circuit.

11. The image processing apparatus according to claim 10, wherein the second switching circuit is configured to be turned on or turned off by the pull-up circuit and the pull-down circuit, in reverse operation to the first switching circuit.

12. The image processing apparatus according to claim 10, wherein the second switching circuit is further configured to prevent the power supplied to the first terminal from being supplied to the signal processor while the first switching circuit is turned on, and allow the first terminal and the signal processor to be connected while the first switching circuit is turned off.

13. The image processing apparatus according to claim 10, wherein the switching unit further comprises a controller configured to turn on the first switching circuit and turn off the second switching circuit in response to a connection to the pull-up circuit, and configured to turn off the first switching circuit and turn on the second switching circuit in response to disconnection from the pull-up circuit.

14. The image processing apparatus according to claim 4, wherein the switching unit is further configured to cut off the power from the power supply to the first terminal in response to the cable connected to the connector complying with a second standard preset not to connect the second terminal and the third terminal, or in response to the cable not being connected to the connector.

15. The image processing apparatus according to claim 14, wherein the cable corresponding to the first standard complies with mobile high-definition link (MHL) standards, and the cable corresponding to the second standard complies with high-definition multimedia interface (HDMI) standards.

16. An image processing apparatus comprising:
a signal processor;
a connector configured to connect to a cable to transmit signals between the signal processor and an external device, the connector compliant with high-definition multimedia interface (HDMI) standards comprising a plurality of terminals including a first terminal, a second terminal being a transition minimized differential signaling (TMDS) data 2 shield terminal of the connector, and a third terminal being a display data channel (DDC) Clock terminal of the connector;
a switching unit connected to the first terminal; and
a power supply configured to supply power to the signal processor,
wherein the switching unit is configured to detect whether the second terminal and the third terminal are connected with each other while the signal processor is in a stand-by mode,
wherein the switching unit is configured to switch on to allow the power from the power supply to be transmitted to the external device via the first terminal in response to the second terminal and the third terminal being connected with each other due to the cable compliant with mobile high-definition link (MHL) standards being connected to the connector even while the signal processor is in the stand-by mode, and
wherein the power from the power supply is not supplied to the external device while the second terminal and the third terminal are not connected with each other.

17. An image processing apparatus comprising:
a signal processor;
a connector configured to connect to a cable to transmit signals between the signal processor and an external device, the connector compliant with high-definition multimedia interface (HDMI) standards comprising a first terminal, a second terminal being a transition minimized differential signaling (TMDS) data 2 shield terminal of the connector, and a third terminal being a display data channel (DDC) Clock terminal of the connector;
a switching unit connected to the first terminal of the connector; and a power supply configured to supply power to the signal processor and to the switching unit, wherein the switching unit is configured to detect whether the second terminal and the third terminal are connected with each other while the signal processor is in a stand-by mode, wherein the switching unit is configured to switch on to allow the power from the power supply to be transmitted to the external device via the first terminal in response to a mobile high-definition link (MHL) standards cable being connected to the connector even while the signal processor is in the stand-by mode, and to cut off the power from the power supply to the first terminal so that power is not transmitted to the external device in response to a high-definition multimedia interface (HDMI) standards cable being connected to the connector, and wherein the MHL standards cable is configured to connect the second terminal and the third terminal of the connector with each other while connected to the connector, and the HDML standards cable is configured to not connect the second terminal and the third terminal of the connector with each other while connected to the connector.

18. The image processing apparatus according to claim 17, wherein the switching unit is further configured to cut off the power from the power supply to the first terminal so that power is not transmitted to the external device in response to no cable being connected to the connector.

* * * * *